(12) United States Patent
Saulsbury

(10) Patent No.: US 7,331,043 B2
(45) Date of Patent: Feb. 12, 2008

(54) DETECTING AND MITIGATING SOFT ERRORS USING DUPLICATIVE INSTRUCTIONS

(75) Inventor: Ashley N. Saulsbury, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 608 days.

(21) Appl. No.: 10/180,580

(22) Filed: Jun. 26, 2002

(65) Prior Publication Data

US 2002/0199175 A1 Dec. 26, 2002

Related U.S. Application Data

(60) Provisional application No. 60/301,094, filed on Jun. 26, 2001.

(51) Int. Cl.
*G06F 9/45* (2006.01)
*G06F 11/00* (2006.01)

(52) U.S. Cl. ............... 717/143; 717/141; 717/145; 714/11; 714/17; 714/31

(58) Field of Classification Search ........ 717/168–178, 717/141, 150, 140; 714/10–758
See application file for complete search history.

(56) References Cited

U.S. PATENT DOCUMENTS

| | | | | |
|---|---|---|---|---|
| 6,125,466 A | * | 9/2000 | Close et al. | 714/758 |
| 6,149,318 A | * | 11/2000 | Chase et al. | 717/131 |
| 6,615,366 B1 | * | 9/2003 | Grochowski et al. | 714/10 |
| 6,631,493 B2 | * | 10/2003 | Ottesen et al. | 714/774 |
| 6,678,837 B1 | * | 1/2004 | Quach et al. | 714/38 |
| 6,748,589 B1 | * | 6/2004 | Johnson et al. | 717/150 |
| 6,766,428 B2 | | 7/2004 | Saulsbury et al. | |
| 6,779,087 B2 | | 8/2004 | Saulsbury et al. | |
| 6,785,847 B1 | * | 8/2004 | Jordan et al. | 714/37 |
| 6,845,472 B2 | * | 1/2005 | Walker et al. | 714/42 |
| 6,862,151 B2 | * | 3/2005 | Hoskins et al. | 360/53 |
| 2003/0023932 A1 | * | 1/2003 | Arndt et al. | 714/805 |
| 2004/0153763 A1 | * | 8/2004 | Grochowski et al. | 714/17 |

OTHER PUBLICATIONS

Ziegler, J.F. et al., "IBM experiments in soft fails in computer electronics (1978-1994)", 12 pages, obtained at http://www.research.ibm.com/journal/rd/ziegl/zieglrt.htm; printed on Feb. 13, 2001.
Mueller et al., "RAS strategy for IBM S/390 G5 and G6", IBM J. Res. Develop., vol. 43, No. 5/6, pp. 875-888, Sep./Nov. 1999.

* cited by examiner

*Primary Examiner*—Tuan Dam
*Assistant Examiner*—Isaac Tecklu
(74) *Attorney, Agent, or Firm*—Darby & Darby P.C.; M. David Ream

(57) ABSTRACT

Software techniques are employed to mitigate soft errors. In particular, a compiler (or other executable code generator) may emit otherwise duplicative instructions targeting otherwise duplicative storage locations to facilitate run-time detection and, in some cases, mitigation of soft errors. In general, a compiler emits a program sequence of primary instructions that correspond to source code. However, in addition, for those primary instructions that target storage susceptible to soft errors, the compiler may emit corresponding additional instructions that target additional storage. In some implementations the additional storage is not itself susceptible to soft errors. However, more generally, implementations may tolerate soft errors affecting the additional storage, as long as such soft errors are generally uncorrelated with those affecting the storage targeted by the primary instructions.

26 Claims, 2 Drawing Sheets

DETECTING AND MITIGATING SOFT ERRORS USING DUPLICATIVE INSTRUCTIONS

BACKGROUND OF THE INVENTION

1. Field of the Invention

The invention relates to fault detection and/or tolerance, and in particular, to techniques for detecting and/or mitigating the effects of transient soft errors using otherwise duplicative instructions in an instruction stream.

2. Description of the Related Art

It has long been recognized that electronic circuits are vulnerable to a variety of sources of transient "soft errors." In contrast to hard errors caused by physical defects in a device or circuit, the term "soft error" generally refers to transient state errors rather than persistent errors resulting from device or circuit defects or damage. As a general matter, electronic circuits function by identifying small packets of charge as elemental bits of information. Accordingly, any perturbation of these small packets of charge may change the stored information. Sources of perturbation include electromagnetic energy, noisy power supplies and radiation. As device sizes become smaller, susceptibility to soft errors generally increases. In a typical semiconductor integrated circuit, soft errors may trace to environmental factors, externally- or internally-driven power supply perturbations, design factors including operation of an otherwise stable design outside its design envelope, etc.

One of the important sources of soft errors is the ionizing radiation associated with radioactive decay. The semiconductor industry has, over the years, struggled with the effect of trace levels of radioactive isotopes introduced by materials, packaging and manufacturing techniques. Other sources of radiation also play a role in soft error rates. For example, naturally-occurring background radiation (such as from cosmic rays) has been shown to contribute to soft error rates, particularly at high altitudes.

In general, two major techniques have been employed to address soft errors. First, manufacturing processes have been improved to greatly reduce the introduction of radioactive isotopes into production lines. Second, error detection and correction techniques have been introduced into circuit designs. For example, memory designs often incorporate parity or error correcting code (ECC) techniques to allow detection and/or correction of at least single-bit errors. Although ECC techniques can be very effective in mitigating soft errors, they are not without cost. In particular, ECC techniques require extra storage and logic to implement. Unfortunately, the portion of a semiconductor chip (e.g., that for extra memory cells and circuitry) employed to provide error detection and/or correction is not available for other purposes. As a result, given a fixed die size, a processor that employs ECC in its on-chip cache will necessarily have to make do with a smaller on-chip cache than one that does not. Accordingly, a need exists for techniques that allow detection and/or mitigation of soft errors without sacrificing memory or cache size and without special ECC circuitry. Alternatively, a need exists for techniques that allow detection and/or mitigation of soft errors in existing processor or system configurations that may not include facilities for ECC.

SUMMARY OF THE INVENTION

Accordingly, it has been discovered that software techniques can be employed to mitigate soft errors. In particular, it has been discovered that a compiler (or other executable code generator) may emit otherwise duplicative instructions targeting otherwise duplicative storage locations to facilitate run-time detection and, in some cases, mitigation of soft errors. In general, a compiler emits a program sequence of primary instructions that correspond to source code. However, in addition, for those primary instructions that target storage susceptible to soft errors, the compiler may emit corresponding additional instructions that target additional storage. In some implementations the additional storage is not itself susceptible to soft errors. However, more generally, implementations may tolerate soft errors affecting the additional storage, as long as such soft errors are generally uncorrelated with those affecting the storage targeted by the primary instructions. In some realizations, the generally uncorrelated nature of single event upsets allows the additional storage targeted by the additional instructions and that targeted by the primary instructions to be separate locations within the same store or memory hierarchy.

Additional instructions may be emitted to allow detection of discrepancies in values read from storage targeted by the primary instructions and those read from the additional storage. In addition to detection, some realizations may provide facilities (in the form of additional instructions inserted in the program sequence) that allow soft errors to be corrected. For example, on detection of a discrepancy, such additional instructions may instruct the processor to branch backward in the program sequence to recompute values. As a statistical matter, we would not expect the recomputation to exhibit the same error. Alternatively, the additional instructions may instruct the processor to retrieve the value exhibiting the discrepancy from storage less susceptible to transient soft errors. For example, in the case of a write-through cache design, the processor could force the cache to refresh from main memory. In some configurations, main memory may be less susceptible to soft errors or may incorporate ECC.

Both compiler-type and translator-type realizations are contemplated. For example, in some realizations, existing executable code (e.g., binary or object code) may be translated into a corresponding executable program object that, in addition to the program sequence of instructions of the existing code, includes corresponding additional instructions inserted into the program sequence. As with the compiler-based techniques, these corresponding additional instructions target additional storage locations and thereby facilitate detection and/or correction of soft errors.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

A variety of systems are envisioned that employ techniques of the present invention to detect and/or mitigate soft errors using duplicative instructions. For example, compilers, just in time (JIT) compilers, interpreters, binary-to-binary translation programs and other software systems may be employed to generate executable code in (or transform executable code into) a form in which soft-errors that would otherwise go undetected and potentially cause data corruption can, instead, be detected and/or mitigated through execution of extra instructions inserted into an execution path of the executable code. In this way, the compiler, just in time (JIT) compiler, interpreter or binary-to-binary translation program, rather than (or in addition to) fault tolerant hardware or system techniques provides error detection and/or mitigation.

In general, such techniques may be employed on a highly selective basis (e.g., targeting a specific known or suspected vulnerability) or more comprehensively throughout program code in accordance with the requirements of a particular application. For example, one particularly advantageous use of the invented technique is in mitigating a design weakness, instability, or susceptibility to transient soft errors that is discovered for parts or product in the field (e.g., a microprocessor shipped in a customer system). Accordingly, such a design weakness, instability, or susceptibility could be addressed through recompilation of at least selected program or operating system code using techniques such as described herein. Depending on the nature of the susceptibility, remedial compilation or binary translation could be limited to very narrow circumstances such as a relatively obscure instruction sequence or particular instruction and data store pairings. In cases where a susceptibility to transient error is a function of time in storage, such as in the case of an under margin defect transiently affecting cache or other storage, selection of instructions for duplication may be informed by liveness analysis performed by a compiler. Alternatively, a risk level may factor into selections. For example, risks associated with corruption of an address calculation may be judged to be higher than for data manipulations. Accordingly, address calculation instructions may be more likely to be selected for duplication. Depending on the type of soft error susceptibility, duplication may extend to storage locations in addition to instructions.

Figure 1:
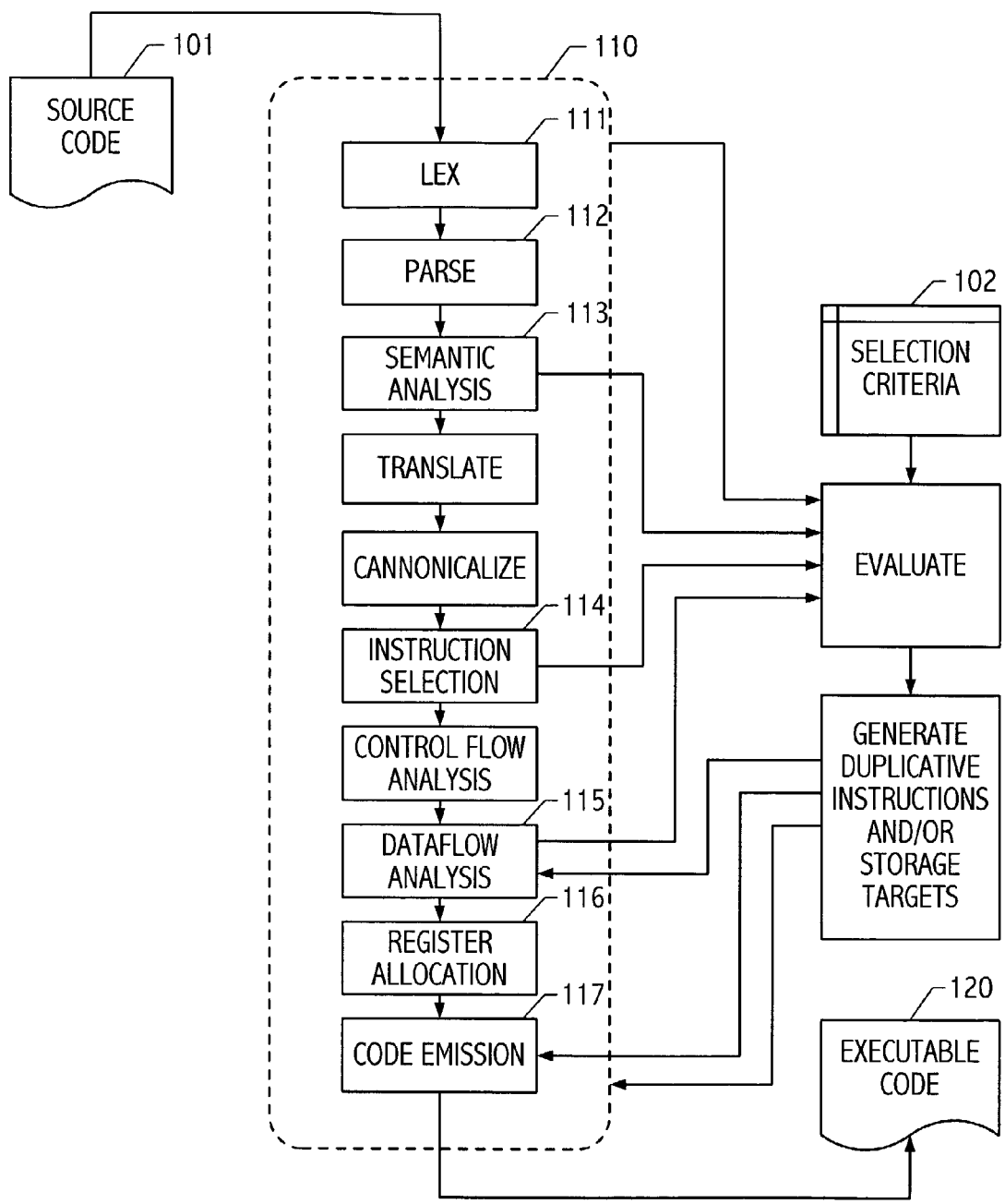
FIG. 1 depicts a data flows associated with an exemplary compiler that generates code including duplicative instructions for detection and/or mitigation of soft errors in accordance with some embodiments of the present invention.

FIG. 1 illustrates data flows associated with an exemplary compiler that generates executable code including duplicative instructions for detection and/or mitigation of soft errors. In general, compiler 110 takes a source code representation 101 and prepares corresponding executable code 120. While persons of ordinary skill in the art will appreciate a variety of suitable compilation techniques, FIG. 1 illustrates a typical decomposition of compiler functionality and serves as a basis for a description of some realizations in accordance with the present invention. More generally, any suitable compilation techniques may be employed and the stages shown in FIG. 1 are mere illustrative.

Compiler technology is well understood in the art. See e.g., Appel & Ginsburg, Modern Compiler Implementation in C, for a review of fundamentals. However, in summary, persons of ordinary skill in the art will understand application of the invented techniques in the illustrative context of FIG. 1. For example, in a typical compiler design, a parser (e.g., parser 112) builds an abstract syntax data structure and passes it to a semantic analysis phase 113. The parser generally employs operations of a lexical analysis phase (e.g., lexer 111) to obtain a sequence of tokens from the source code representation 101 and to analyze the phrase structure of the program. During semantic analysis 113, the compiler determines what each phrase means and relates use of variables to their definitions, checks expression types, etc. Often, a compiler implementation employs a translator interface to produce a language independent intermediate representation and cannonicalization cleans up to intermediate representation and simplify operation of subsequent stages.

Instruction selection 114 identifies instructions of a target machine that correspond to portions of the intermediate representation. Control flow and data flow analyses are performed. In particular, a data flow analysis (e.g., 115) allows the compiler to determine the flow of information through variables of the program. By performing a liveness analysis, the compiler can determine the portion of an execution path during which a variable stores data that will be later used in a program sequence. Once liveness analysis has been performed, the compiler allocates (e.g., at 116) register storage so that live variables efficiently utilize finite storage resources. Finally, temporary names are resolved so that machine instructions refer to machine registers and code is emitted (e.g., code emission 117). Subsequent assembler and linker phases may be employed to generate a particular instance of executable program code.

The techniques of the present invention build on two facilities. First, selection of particular program constructs for duplication and second, insertion of auxiliary program functionality with duplicative instructions. In compiler realizations of the present invention, such facilities may operate at any of a variety of compilation phases. For example, in a typical implementation in accordance with the functional decomposition of FIG. 1, operation of selection and/or instruction insertion facilities may operate at least in part during (or using information available from) semantic analysis phase 113, instruction selection phase 114, data flow analysis phase 115, register allocation phase 116 and/or code emission phase 117. In some implementations, program construct selection and instruction insertion may be performed during a final code emission phase. However, in other implementations, for example, implementations in which instruction selection is performed without regard to assigned registers or in which duplication involves allocation of additional registers, involvement at earlier stages of a compilation may be desirable.

While the illustration of FIG. 1 has presumed a transformation from source to executable code, some implementations may employ similar techniques to transform one executable form to another. Persons of ordinary skill in the art will appreciate suitable modifications to the exemplary compiler configuration; however, in general, such implementations, e.g., as a binary-to-binary translator, simply replace source language lexical and syntactic rules with those appropriate for a binary encoding and may eliminate or truncate certain phases, such as instruction selection and register allocation. Similarly, compiler 110 is illustrative of functions of just-in-time (JIT) compiler implementations, though JIT compiler implementations may omit some functions, such as lexical analysis, and typically include a tighter coupling with actual execution of compiled code. Of course, other code preparation facilities, including other compilers, may implement differing sets and/or sequences of operations while still providing program construct selection and duplicative instruction insertion facilities in accordance with the various embodiments described herein.

In any case, compiler 110 (as an exemplary facility) takes a source language encoding 101 (e.g., Java™ programming language statements, "C" or "C++" source code, etc.) and performs operations to generate executable code 120 (e.g., SPARC™ architecture machine code, other processor object code, Java virtual machine bytecodes, etc.). In some embodiments, source language encoding 101 includes instructions encoded in computer readable media or received incrementally or in toto via communication media such as a local area, wide area or telecommunications network.

Java and all Java-based marks and logos are trademarks or registered trademarks of Sun Microsystems, Inc. in the United States and other countries. SPARC architecture based processors are available from Sun Microsystems, Inc, Mountain View, Calif. SPARC trademarks are used under license and are trademarks or registered trademarks of SPARC International, Inc. in the United States and other countries. Products bearing SPARC trademarks are based upon an architecture developed by Sun Microsystems.

Selection Criteria

A wide variety of criteria may be employed in the selection of program elements for duplication. In general, the employed criteria (e.g., selection criteria 102) are implementation dependent. In some implementations, selection criteria may narrowly target a specific known or suspected vulnerability. Alternatively, some implementations may cast a wider net and result in more comprehensive insertion of duplicative instructions throughout program code.

Selection criteria may target occurrences of a specific instruction, specific sequences of instructions, combinations of one or more specific instructions and register or other storage targets or sources, etc. Such criteria may be particularly appropriate in circumstances where mitigation of a design weakness, instability or timing hazard is known to (or suspected of) increasing a susceptibility to transient soft errors. Alternatively, selection criteria may include time in storage as a susceptibility factor. For example, some implementations may employ liveness analysis performed at least in part by the compiler or other transformation program to identify certain program variables for which a threshold level of temporal exposure to transient soft errors is exceeded. For example, a value maintained in a register or in cache for an extended period of time may be viewed as more likely than other values to have sustained a single event upset or an intervening supply voltage collapse and data corruption. Accordingly, time in storage may be a useful selection criterion in some cases. Analogously, at least for multicycle operations in which intermediate data paths or data stores may be vulnerable to transient soft errors, threshold number of iterations or cycles may be similarly be employed to select certain multicycle operations for duplication.

In addition or alternatively, a measure of risk or impact may be employed in some selection criteria. For example, address computations may be viewed as much higher risk than mere data manipulations in certain systems. For example, perturbation of even a single bit of a pointer, address or index may alter a branch target and therefore the execution path of a program, causing errant behavior, a memory system violation, trap or program halt. In like manner, instruction stream manipulations such as store-into-instruction-stream operations performed in systems that support dynamic recompilation or self-modifying code may present similarly high levels of risk. For example, perturbation of even a single bit of an instruction may result in errant behavior, an invalid instruction, trap or program halt.

Depending on the type or combination of selection criteria employed, selection and insertion of duplicative instructions are performed at (or use information from) an appropriate compiler stage or stages. Typically, final stages of a compiler (e.g., code emission and register allocation) are appropriate. However, in some implementations, selection and/or insertion are performed at earlier stages. For example, in implementations where additional register storage may be required, it may be useful to insert duplicative instructions and storage targets prior to register allocation. Similarly, as described above, liveness analysis from a dataflow analysis phase may be employed in some implementations.

Duplicative Instructions

Figure 2:
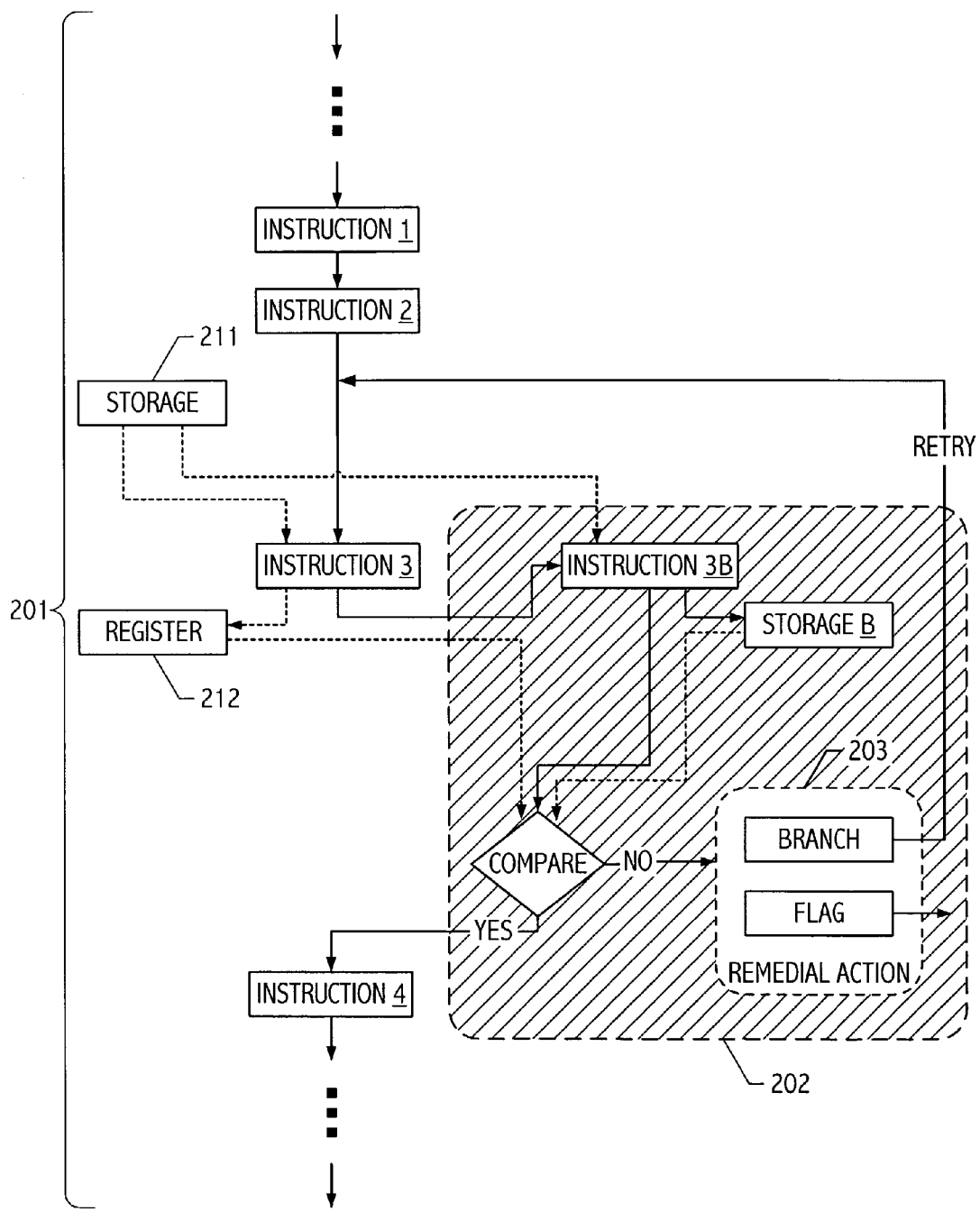
FIG. 2 illustrates control and data flows in an exemplary code fragment in which duplicative instruction(s) is(are) employed for detection and/or mitigation of soft errors in accordance with some embodiments of the present invention.

FIG. 2 illustrates control and data flows in an exemplary code fragment 201 in which a set of duplicative instructions is employed for detection and/or mitigation of soft errors. An initial sequence of instructions, including instructions 1, 2, 3 and 4, are augmented based on a selection performed using any suitable criteria such as described above. In the illustrated case, instruction 3 has been selected for duplication. Instruction 3 sources data from storage 211 and stores data in register 212.

Duplicative instructions 202 are spliced into the program sequence using any suitable mechanism. For example, in some realizations, duplicative instructions 202 are included in-line in program code. In others, a branch or branches (not specifically shown) may be added into the program code or instruction stream to augment the initial sequence of instructions. Persons of ordinary skill in the art will appreciate suitable variations for specific implementations. In the illustration of FIG. 2, an additional instruction 3B, typically a duplicate of instruction 3 but with a differing register target, is included in the set of duplicative instructions 202. A duplicative target, i.e., storage B, which may be register storage or (with a suitable additional instruction 3B) another class of storage such as memory is also added. Results of instruction 3 and additional instruction 3B are compared (e.g., using any suitable comparison instruction or operation sequence). If a discrepancy is detected, appropriate remedial action 203 is taken. For example, remedial action may include a backward branch to retry and/or flagging or logging the discrepancy. In general, for truly transient soft errors, retry is an extremely successful strategy and can generally be expected to result in successful comparison on the next try. Other realizations may employ other techniques such as tri-modular redundancy (TMR) to handle discrepancies, though with some increased duplicative instruction overhead. In general, damaged data can be repaired either by recomputing using original data, or by retrieving data from a more secure storage area such as main memory.

Of course, some implementations may duplicate larger numbers of instructions or may include more complicated sets of duplicative instructions. While a strong correspondence typically exists between instructions and data stores of a pre-existing construct and those instructions and data stores employed in a set of duplicative instructions 202, mere functional equivalence is suitable for many implementations. Accordingly, the exact instructions and data store types need not be duplicated. In addition, a duplicative set of instructions need not be contiguous. Indeed, particularly in implementations that attempt to address lengthy exposure of data to transient errors, comparison of other detection instructions may be separated from those duplicative instructions that create a redundant copy of the data by large numbers of intervening instructions.

While the invention has been described with reference to various embodiments, it will be understood that these embodiments are illustrative and that the scope of the invention is not limited to them. Many variations, modifications, additions, and improvements are possible. For example, while compiler facilities have been used as a descriptive context, the invention is not limited thereto. Indeed, the other executable code generators including just-in-time compilers, binary translators, etc. may be employed. More generally, plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method of preparing code suitable for execution on a processor, the method comprising:
    evaluating a source program object to identify at least one operation that targets storage that is susceptible to transient soft errors;
    processing the source program object to produce a corresponding executable program object, the processing including emitting executable instructions corresponding to the source program object;
    based on the evaluating, for at least one of the emitted executable instructions that corresponds to the identified at least one operation, further emitting at least one duplicative executable instruction targeting additional storage; and
    emitting additional executable instructions to both detect and correct a discrepancy between a value read from the targeted storage and a corresponding value read from the additional storage.

2. The method of claim 1,
    wherein the additional storage is also susceptible to transient soft errors, but the transient soft errors in the additional storage are substantially uncorrelated with those associated with the targeted storage.

3. The method of claim 1, wherein the targeted storage and the additional storage are distinct.

4. The method of claim 1, wherein the targeted storage includes cache memory or register storage.

5. The method of claim 1,
    wherein the additional executable instructions correct the discrepancy with a value read from a third storage.

6. The method of claim 1,
    wherein the additional executable instructions to correct the discrepancy include a branch that re-executes at least a portion of the executable program object.

7. The method of claim 1,
    wherein the additional executable instructions to correct the discrepancy include a load from storage less susceptible to transient soft errors than the targeted storage.

8. The method of claim 7,
    wherein the targeted storage susceptible to transient soft errors includes cache memory; and
    wherein the storage less susceptible to transient soft errors is storage representing an underlying state in a memory hierarchy that includes the cache memory.

9. The method of claim 1,
    wherein the targeted storage susceptible to transient soft errors includes cache memory.

10. The method of claim 1,
    wherein the targeted storage susceptible to transient soft errors includes a memory hierarchy for which a value associated with a particular memory location may at any particular time be represented in a corresponding cache location, and wherein at least one of the memory location and the corresponding cache location is susceptible to transient soft errors.

11. The method of claim 1,
    wherein the targeted storage susceptible to transient soft errors includes register storage.

12. A method of preparing code suitable for execution on a processor, the method comprising:
    evaluating a first encoding of a computer program product to identify at least one operation that targets storage that is susceptible to transient soft errors;
    processing the first encoding to produce a corresponding executable program object, the processing including emitting executable instructions corresponding to the first encoding;
    based on the evaluating, for at least one of the emitted executable instructions that corresponds to the identified at least one operation, further emitting at least one duplicative executable instruction targeting additional storage; and
    emitting additional executable instructions to both detect and correct a discrepancy between a value read from the targeted storage that is susceptible to transient soft errors and a corresponding value read from the additional storage;
    wherein the first encoding includes a first executable program object; and
    wherein the processing includes transformation of the first executable program object into the corresponding executable program object, the corresponding executable program object including the at least one duplicative executable instruction.

13. The method of claim 12, wherein the additional executable instructions correct the discrepancy with a value read from a third storage.

14. A computer program product encoded in at least one computer readable storage medium, the computer program product comprising:
    a compiler that evaluates a source program object to identity at least one operation that targets storage that is susceptible to transient soft errors and emits instructions of an executable program object corresponding to the source program object,
    wherein at least some of the emitted instructions target the storage susceptible to transient soft errors and wherein the compiler also emits corresponding additional executable instructions that target additional storage, wherein transient soft errors, if any, affecting the additional storage are substantially uncorrelated with those affecting the targeted storage, and wherein the additional executable instructions detect the transient soft errors by comparing values read from the targeted storage that is susceptible to transient soft errors with corresponding values from the additional storage, and correct the transient soft errors.

15. A computer program product encoded in at least one computer readable storage medium, the computer program product comprising:
- a binary translator that evaluates a first executable program object to identify at least one operation that targets storage that is susceptible to transient soil errors and transforms the first executable program object to produce a corresponding second executable program object for which effects of transient soft errors are mitigated on execution thereof,
- wherein at least some executable instructions of the first executable program object target the storage susceptible to transient soft errors and wherein the binary translator emits corresponding additional executable instructions that target additional storage, wherein transient soft errors, if any, affecting the additional storage are substantially uncorrelated with those affecting the targeted storage, and wherein the additional executable instructions detect the transient soft errors and mitigate at least one of the detected transient soft errors with a value read from a third storage.

16. A method of mitigating transient soft errors in a processor that implements a first instruction that stores a result in storage susceptible thereto, the method comprising:
- executing, as part of a program sequence, an instance of the first instruction targeting the transient soft error susceptible storage;
- executing, as part of the program sequence, an instance of an additional instruction targeting additional storage, the additional instruction execution substantially duplicative of the first instruction execution, wherein transient soft errors, if any, affecting the additional storage are substantially uncorrelated with those affecting the targeted transient soft error susceptible storage;
- comparing a result of the execution of the instance of the first instruction with a result of the execution of the instance of the additional instruction to determine presence of a transient soft error;
- if the comparison indicates presence of a soft error, retrieving data from a third storage to replace data damaged by the transient soft error.

17. The method of claim 16,
- wherein the transient soft error susceptible storage includes cache memory.

18. The method of claim 16,
- wherein the transient soft error susceptible storage includes a processor register.

19. The method of claim 16,
- wherein the additional instruction is an additional instance of the first instruction.

20. The method of claim 16,
- wherein the additional storage is also susceptible to transient soft errors and wherein the third storage comprises main memory.

21. The method of claim 16, wherein the comparing comprises detecting a discrepancy between a value retrieved from the transient soft error susceptible storage and a corresponding value retrieved from the additional storage.

22. The method of claim 21, further comprising:
- triggering a remedial action in response to the discrepancy detection wherein the remedial action comprises retrieving data from the third storage.

23. A computer program product encoded in at least one computer readable storage medium, the computer program product comprising:
- a program sequence including an instance of a first instruction targeting transient soft error susceptible storage;
- an instance of an additional instruction targeting additional storage, wherein execution of the additional instruction is substantially duplicative of execution of the first instruction, but transient soft errors, if any, affecting the additional storage are substantially uncorrelated with those affecting the storage targeted by the first instruction; and
- additional instructions executable to detect a discrepancy between a value read from the storage targeted by the first instruction and a corresponding value read from the additional storage and correct the discrepancy with a value read from a third storage.

24. The computer program product of claim 23,
- wherein the third storage is less susceptible to transient soft errors than the transient soft error susceptible storage.

25. An apparatus comprising:
- means for emitting instructions for an executable program abject;
- means for identifying a first instruction of the executable program object that targets storage susceptible to transient soft errors;
- means for emitting at least one additional executable instruction corresponding to the first instruction and targeting additional storage for which transient soft errors, if any, are substantially uncorrelated with those affecting the targeted storage;
- means for emitting additional executable instructions to detect a discrepancy between a value read from the targeted storage and a corresponding value read from the additional storage; and
- means for emitting still additional executable instructions to resolve the discrepancy by reading a substitute value from a third storage.

26. The apparatus of 25, wherein the third storage is less susceptible to transient soft errors than the storage susceptible to transient soft errors.

* * * * *

UNITED STATES PATENT AND TRADEMARK OFFICE
CERTIFICATE OF CORRECTION

PATENT NO. : 7,331,043 B2  Page 1 of 1
APPLICATION NO. : 10/180580
DATED : February 12, 2008
INVENTOR(S) : Saulsbury It is certified that error appears in the above-identified patent and that said Letters Patent is hereby corrected as shown below:

Column 3, line 63, delete "Modem" and insert -- Modern --, therefor.

Column 8, line 52, in Claim 14, delete "identity" and insert -- identify --, therefor.

Column 9, line 6, in Claim 15, delete "soil" and insert -- soft --, therefor.

Column 10, line 33, in Claim 25, delete "abject;" and insert -- object; --, therefor.

Signed and Sealed this

Twenty-fifth Day of March, 2008

JON W. DUDAS
*Director of the United States Patent and Trademark Office*